(12) United States Patent
Konijn et al.

(10) Patent No.: US 7,510,173 B2
(45) Date of Patent: Mar. 31, 2009

(54) GAS-LIQUID CONTACTING TRAY

(75) Inventors: Gerrit Konijn, Amsterdam (NL); Asheesh Viswanatha Sastry, Amsterdam (NL); Manfred Heinz Voetter, Amsterdam (NL); Rubin Keith Whitt, Houston, TX (US)

(73) Assignee: Shell-Oil Company, Houston, TX (US)

( * ) Notice: Subject to any disclaimer, the term of this patent is extended or adjusted under 35 U.S.C. 154(b) by 508 days.

(21) Appl. No.: 10/583,611

(22) PCT Filed: Dec. 21, 2004

(86) PCT No.: PCT/EP2004/053633

§ 371 (c)(1),
(2), (4) Date: Jun. 20, 2006

(87) PCT Pub. No.: WO2005/061070

PCT Pub. Date: Jul. 7, 2005

(65) Prior Publication Data

US 2007/0145612 A1    Jun. 28, 2007

(30) Foreign Application Priority Data

Dec. 22, 2003 (EP) ................................ 003104883

(51) Int. Cl.
    *B01F 3/04* (2006.01)
(52) U.S. Cl. .................. 261/114.1; 261/114.5
(58) Field of Classification Search ............. 261/114.1, 261/114.2, 114.3, 114.4, 114.5
See application file for complete search history.

(56) References Cited

U.S. PATENT DOCUMENTS

| | | | |
|---|---|---|---|
| 4,582,569 A * | 4/1986 | Jenkins ........................ 202/158 |
| 5,885,488 A | 3/1999 | Konijn ........................ 261/79.2 |
| 6,371,455 B1 * | 4/2002 | Lee et al. .................. 261/114.1 |
| 6,460,833 B2 | 10/2002 | Konijn ..................... 261/114.1 |
| 6,494,440 B2 | 12/2002 | Bosmans et al. ......... 261/114.1 |
| 6,568,663 B1 * | 5/2003 | Xu et al. .................. 261/114.1 |
| 6,588,735 B2 | 7/2003 | Bosmans et al. ......... 261/114.1 |
| 6,863,267 B2 * | 3/2005 | Bosmans et al. ......... 261/114.1 |

FOREIGN PATENT DOCUMENTS

EP         0626185        11/1994
WO       2004/073836      9/2004

OTHER PUBLICATIONS

International Search Report of PCT/EP2004/053633, Feb. 2005.

* cited by examiner

*Primary Examiner*—Scott Bushey
(74) *Attorney, Agent, or Firm*—William E. Hickman

(57) ABSTRACT

A gas-liquid contacting tray suitable for horizontal mounting in a normally vertical column, which tray comprises a tray plate with substantially circular circumference and having top and bottom surfaces, which tray plate is provided with passages for gas between the bottom and the top surface, and on which tray plate two semi-circular tray sections are defined by a virtual diametrical line of the tray plate; and a total of three downcomers for guiding liquid from the top surface of the tray plate to below the tray, each downcomer extending from an inlet opening arranged in the tray plate to a downcomer outlet opening below the tray, wherein two of the downcomers are arranged in the corners of one of the semi-circular tray sections, and wherein the third downcomer is arranged on the other tray section substantially along a radius of the tray that is perpendicular to the diametrical line.

9 Claims, 2 Drawing Sheets

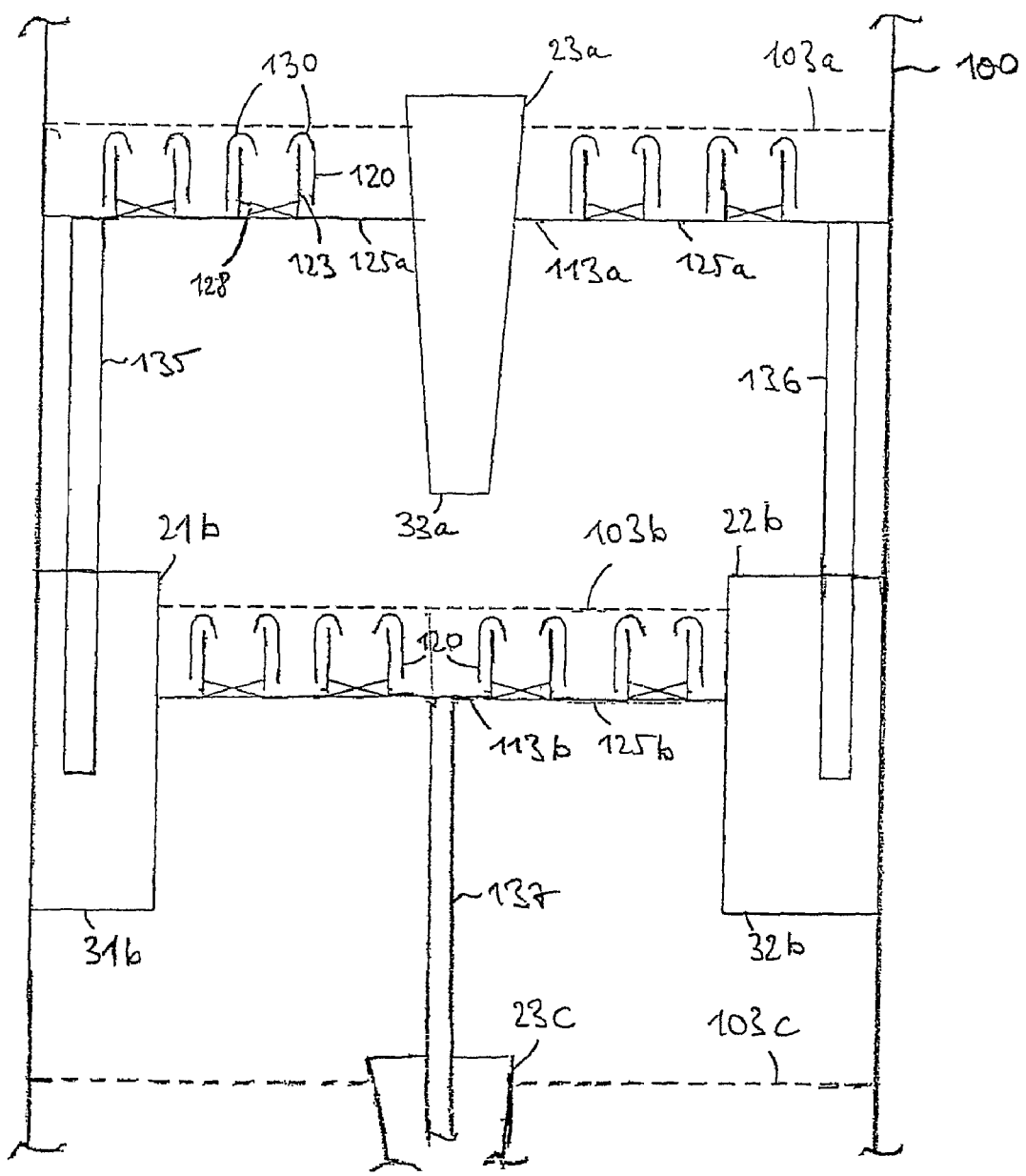

GAS-LIQUID CONTACTING TRAY

PRIORITY CLAIM

The present application is filed under 35 U.S.C. 371 as a national stage filing of PCT/EP04/53633, filed Dec. 21, 2004, which claims the benefit of priority to European Patent Application No. 03104883.8 filed Dec. 22, 2003.

FIELD OF THE INVENTION

The invention relates to a gas-liquid contacting tray suitable for horizontal mounting in a normally vertical column for counter-currently contacting gas and liquid.

BACKGROUND OF THE INVENTION

Relatively small gas-liquid contacting columns of between 1 and 2 m diameter present a number of specific challenges for the design of an efficient gas-liquid contacting tray.

In a traditional design, a single segmental downcomer is arranged on each tray in a column. A segmental downcomer is a downcomer wherein the downcomer inlet opening is arranged near the wall so that part of the circumference of the downcomer inlet opening runs along the circumference of the tray (column wall). In a vertical gas/liquid contacting column, a plurality of such trays are stacked wherein consecutive trays are rotated by 180 degrees about the column axis, so that each tray receives liquid from the downcomer outlet of the next higher tray on a liquid receiving area diametrically opposite to the downcomer inlet opening. This design has however disadvantages.

One disadvantage is that the flow path length of liquid over the tray is relatively long, in the order of the diameter of the tray minus the width of the downcomer. Although this might be thought of as an advantage in the first place, it turns out that a relatively large gradient in liquid height develops on the tray during normal operation, between the liquid receiving area and the downcomer inlet opening. This maldistribution of liquid impairs tray efficiency and capacity in that gas preferably passes through gas passages in the area of low liquid height, near the downcomer inlet opening. Also, at the largest liquid heights, liquid can weep through the gas passages which limits tray capacity.

A further problem with single segmental downcomers is that in the flow pattern of liquid over a tray so-called dead zones are formed near the column wall, halfway between the receiving area and the downcomer inlet opening. The dead zones result in a lower tray efficiency, unless special measures are taken in order to improve the flow pattern.

A further disadvantage is that it is not possible to provide large downcomer inlet openings without compromising tray efficiency, in cases of high liquid load of the column. Liquid load can be expressed in terms of the flow parameter $$\Phi = \frac{V_l}{V_g}\sqrt{\frac{\rho_l}{\rho_g}},$$

wherein the $V_l$ and $V_g$ are liquid and gas volumes in the feed per unit of time, and $\rho_l$ and $\rho_g$ are the densities of liquid and gas, respectively. At high liquid loads the flow parameter is equal to or larger than about 0.1.

In order to provide a large downcomer inlet opening, e.g. 20%-27% of the total cross-sectional area of the tray or more, a very wide segmental downcomer has to be used. However, such a downcomer still has a relatively low downcomer inlet length. The term downcomer inlet length is used in the description and in the claims to refer to the length of the circumference of the downcomer from which liquid can be received from the tray. This length is often provided with a weir in order to provide for a minimum liquid height on the tray. Therefore the downcomer inlet length is often also referred to as weir length even if no weir is arranged.

A relatively short downcomer inlet length in combination with a relatively large downcomer inlet area is undesirable because the inlet length becomes the limiting factor for liquid handling capacity. This results in relatively large liquid heights on the tray, which is generally unwanted since it contributes to premature jet-flooding, and therefore limits tray capacity.

An alternative tray design in smaller columns, in order to provide more downcomer inlet length, is the so-called two-pass tray. In this design two types of trays are used that are alternatingly stacked in a column. The first type of trays has two segmental downcomers that are arranged diametrically opposite to each other on the tray. The second type has a single rectangular downcomer along a diameter of the tray, which is arranged parallel to the segmental downcomers of the adjacent trays. The liquid flow path length in this two-pass design is in the order of half the tray diameter minus the downcomer width.

The two-pass tray design also has disadvantages. First, two significantly different types of trays have to be manufactured. Second, one tray type will normally be limiting, and it is nearly impossible to provide a fully balanced design. For example, the downcomer inlet length is significantly different on both tray types. Third, on the tray with the single diametrical downcomer there is normally no fluid communication between tray areas on either side of the downcomer, above and below the tray. Therefore different liquid levels may develop on both sides, and there is no vapour communication below the tray, and this impedes tray efficiency. In principle, fluid communication channels can be arranged between the two sides to alleviate the vapour communication problem, however this adds to complexity and cost of the tray.

In another tray design, which is often applied for larger trays, a plurality of parallel downcomers is arranged between the circumference of the tray and a virtual diametrical line. Examples of this tray design are disclosed in U.S. Pat. Nos. 6,460,833, 6,494,440, and 6,588,735. The arrangement of downcomers on the two tray sections is identical, such that one tray section can be transformed into the other by a rotation about 180 degrees about the centre of the tray. The total number of downcomers is even. On each tray section at least one substantially rectangular downcomer is arranged along a line perpendicular to the virtual diametrical line. Also on each tray section one segmental downcomer can be arranged in a corner between the virtual diametrical line and the tray circumference. The downcomers on the two tray sections form a staggered arrangement. Adjacent trays in a column are mirror images of each other with the virtual diametrical line as mirror.

This layout of downcomers on the tray works well for larger columns having a diameter above ca 2 m. It can also be applied for smaller diameter columns, however the design has to increasingly take account of a limitation that the flow path length, which is in the order of half the distance between adjacent downcomers on a tray section, does not become too small. This is in particular the case when a relatively large downcomer inlet area needs to be provided on the tray in order to provide sufficient liquid handling capacity. For new columns one could choose a larger diameter in order to provide a minimum flow path length, for retrofitting existing columns this is not possible.

For example, it can be calculated that, with one rectangular and one segmental downcomer per tray section in the known layout, a flow path length of say 250 mm parallel to the virtual diametrical line can only be realised on a tray with say 1.5 m diameter, if the total downcomer inlet area is less than 18% of the total cross-sectional area of the tray.

SUMMARY OF THE INVENTION

It is an object of the present invention to provide a gas-liquid contacting tray with high liquid handling capacity particularly in small columns, and allowing robust and efficient operation and cost-efficient manufacturing of the tray.

According to the invention there is provided a gas-liquid contacting tray suitable for horizontal mounting in a normally vertical column, which tray comprises a tray plate with substantially circular circumference and having top and bottom surfaces, which tray plate is provided with passages for gas between the bottom and the top surface, and on which tray plate two semi-circular tray sections are defined by a virtual diametrical line of the tray plate; and a total of three downcomers for guiding liquid from the top surface of the tray plate to below the tray, each downcomer extending from an inlet opening arranged in the tray plate to a downcomer outlet opening below the tray, wherein two of the downcomers are arranged in the corners of one of the semi-circular tray sections, and wherein the third downcomer is arranged on the other tray section substantially along a radius of the tray that is perpendicular to the diametrical line.

BRIEF DESCRIPTION OF THE DRAWING

FIG. 2, shows schematically a particular embodiment of contacting trays according to the invention together with separation trays in a column.

DETAILED DESCRIPTION OF THE INVENTION

Figure 1:
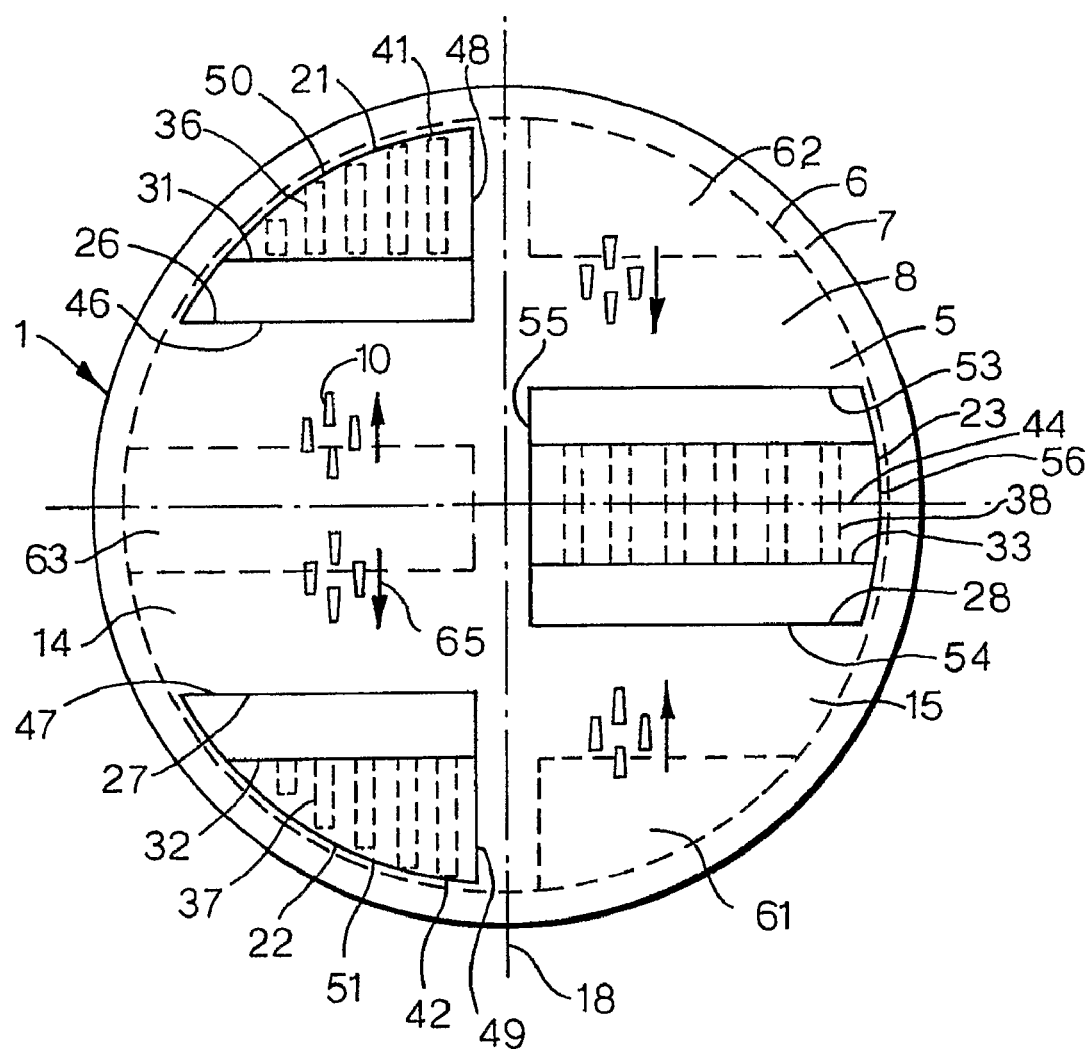
FIG. 1, shows schematically a top view of a gas-liquid contacting tray according to the present invention.

The invention provides a specific advantageous design of a gas-liquid contacting tray, with two downcomers in the corners of one of the tray sections (hereafter "corner downcomers"), and one downcomer substantially along a radius of the tray (hereafter "radial downcomer", even though the downcomer does not need to extend along the full length of the radius).

When trays according to the invention are stacked in a column, wherein adjacent trays are rotated relative to each other by 180 degrees about the column axis, the projection of downcomers of a higher tray onto the next lower tray coincides with the mirror images of downcomers on the lower tray with respect to the virtual diametrical line as mirror axis. The outlets of the two corner downcomers in one tray section of the upper tray are symmetrically arranged with respect to the inlet of the radial downcomer of the lower tray, and the outlet of the radial downcomer of the upper tray is symmetrically arranged between the inlets of the corner downcomers of the lower tray. It is therefore not needed to manufacture two kinds of trays.

The arrangement of downcomers in both tray sections is very different, one radial versus two half-segmental (corner) downcomers. As a consequence of this asymmetry, the downcomer inlet length, downcomer inlet area and ratio between downcomer inlet length and downcomer inlet area is in general different in both tray sections. Prior to the present invention one would have expected that the asymmetry causes severe problems limiting tray capacity and/or efficiency, because of potential maldistribution of liquid over the two tray sections. Applicant has realized however that the asymmetry is not a problem in practice. Any maldistribution of liquid between the two tray sections will not result in a large gradient of liquid height because of the open communication of fluid between the tray sections, and because of the fact that the maximum flow path length for liquid to the nearest downcomer is not too long, in the order of only half a tray diameter minus downcomer width at the level of the tray plate (so-called top width). If required, the downcomer inlet length and/or downcomer inlet area on both tray sections can be adjusted individually, e.g. by proper selection of the width and shape of the corner downcomers, and/or the width of the radial downcomer, so that a properly balanced design is obtained.

Suitably the ratio of the downcomer inlet area of the radial downcomer to the downcomer inlet area of both half-segmental (corner) downcomers together is between 0.75 and 1.25, preferably between 0.9 and 1.1.

Suitably the ratio of the downcomer inlet length of the radial downcomer to the downcomer inlet length of both half-segmental (corner) downcomers together is between 0.75 and 1.25, preferably between 0.9 and 1.1.

The design with three downcomers according to the invention provides an average flow path length of liquid over the tray (bubble area), that is long enough for good gas/liquid contact even in small columns of 1 m to 2 m diameter, and even for relatively large downcomer inlet areas of 20-27% and more, relative to the total tray cross-sectional area. The design is however also suitable for lower relative downcomer inlet areas down to 8% or less, e.g. 10 or 15%.

The tray according to the invention has a relatively large portion of downcomer inlet length parallel to the virtual diametrical line separating the tray sections. Nevertheless, Applicant has found that liquid bypassing is not a problem. The term liquid bypassing is used to refer to liquid running directly from the outlet of a downcomer into the inlet of the nearest downcomer on the other tray section of the lower tray. Experiments have been performed to estimate the influence of liquid bypassing between corner downcomers, wherein high baffles were placed on the lower tray at the sides of the corner downcomer inlet openings along the virtual diametrical line. It was found that placing these baffles did not significantly improve tray efficiency in an n-butane/iso-butane separation experiment, wherein tray efficiency is defined as the fraction of mass transfer achieved in the vapour phase as compared to the equilibrium mass transfer. However, it was found that tray capacity was significantly lower when the baffles were placed.

An advantage of the tray according to the invention as compared with the single segmental and two-pass trays is the larger downcomer inlet length which results in lower liquid heights on the tray and leads to higher tray capacity.

The tray of the invention can with advantage be used in an arrangement with a separation tray adjacent to the contacting tray, which separation tray is provided with one or more centrifugal separation devices. The contacting tray can in particular be integrally formed with the separation tray.

Reference is made to FIG. 1. The tray 1 comprises a tray plate 5 with substantially circular circumference 6. Around the circumference a support ring 7 is arranged, by means of which the tray can be mounted horizontally in a vertical column (not shown). The tray plate has top and bottom surfaces, of which the top surface 8 is visible in FIG. 1. The tray plate is provided with passages for gas 10 between the bottom and the top surface, which can be in the form of sieve holes, moveable valves, fixed valves, or other gas passages known in the art. The passages for gas 10 are shown only at some locations on the tray plate, but extend over essentially the entire free area of the tray plate not occupied by downcomers. It is also possible to arrange special or no passages in the liquid receiving area directly underneath a downcomer of a higher tray in a column. The area provided with passages is commonly referred to as bubbling area.

Two semi-circular tray sections 14, 15 are defined by a virtual diametrical line 18 of the tray plate 5. Three downcomers 21, 22, 23 for guiding liquid from the top surface of the tray plate to below the tray are arranged in the tray. Each downcomer extends from an inlet opening 26, 27, 28 arranged in the tray plate to a downcomer bottom plate 31, 32, 33 below the tray. In the bottom plates, outlet openings are arranged that form a suitable restriction for liquid flow, and in the embodiment as shown the outlet openings have the form of rectangular slots 36, 37, 38. As is visible in the Figure, the bottom plates have smaller cross-section than the respective inlet openings, and are connected by sloped downcomer side walls, i.e. the downcomers as shown are so-called sloped downcomers. Suitably the downcomers are so-called truncated downcomers, which means that the bottom plate is arranged some distance above the liquid receiving area on the tray plate below when the trays are mounted one above the other in a vertical column. A truncated downcomer suitably extends to between 50% and 90% of the tray spacing below the tray. Tray spacing can be defined as the distance between the top surfaces of two adjacent tray plates in the column. Suitably the tray spacing is between 0.2 m and 1 m.

Two of the downcomers are arranged in the corners 41, 42 of the semi-circular tray section 14, which corners are defined by the diametrical line 18 and the circumference 6. The corner downcomers 41, 42 are substantially half-segmental downcomers. The inlet opening 26, 27 of each half-segmental downcomer is defined by a straight longer side 46, 47 perpendicular to the virtual diametrical line 18, a straight shorter side 48, 49 facing and parallel with the line 18, and a curved rear side 50, 51 adjacent to the circumference 6. It shall be clear that, in order to save manufacturing cost, the rear side wall can also be manufactured from a flat plate or a plurality of flat plates suitably assembled along a polygonal line which follows the curved shape of the rear side as shown.

The third downcomer 32 is arranged on the other tray section 15, and extends substantially along a radius 44 of the tray that is perpendicular to the diametrical line 18. The radial downcomer 32 is a so-called rectangular downcomer, wherein the inlet opening 28 is defined by two longer sides 53, 54 that run parallel with and at equal distances to the radius 44, and two shorter sides 55, 56. Side 55 is parallel to and faces the diametrical line 18 at a selected distance. It will be clear that the side 56 adjacent to the circumference 6 can be curved as shown or also straight, e.g. to minimize manufacturing cost.

The Figure also shows the projections of the bottom plates 61, 62, 63 of the downcomers of the next higher tray in the column onto the tray plate 5.

During normal operation of the tray 1 in a column, liquid will be received on the tray 1 in the area of the projections 61, 62, 63. Liquid will generally flow towards the inlet of the adjacent downcomers, wherein the main flow directions of liquid at various locations on the tray are indicated by arrows 65. During this passage of liquid, gas can bubble through via the gas passages 10 so that intimate contact of gas and liquid is achieved so that heat and/or matter can be exchanged.

The liquid is received by the inlet openings 26, 27, 28 of the downcomers 21, 22, 23 and passes via the downcomer outlets 36, 37, 38 onto the next lower tray. The downcomer inlet length of each corner downcomers 21, 22 is formed by the total length of the respective long and short side, 46, 48; and 47, 49 respectively. The downcomer inlet length of the rectangular downcomer 23 is formed by the total length of the sides 53, 54, and 55.

The shorter sides of the downcomers contribute to a relatively large percentage to the total downcomer inlet length in the trays according to the present invention. It was thought prior to the present invention that this would strongly affect tray efficiency since liquid could easily flow from a liquid receiving area on one tray section to the inlet of the adjacent downcomer on the other tray section, e.g. from area 61 to downcomer 22, from 62 to 21, and from 63 to 23. Such an effect should be most pronounced for the corner downcomers. Differently from all other tray designs known before there is no rectangular downcomer in tray section 14, so the two corner downcomers constitute all of the downcomers in this one tray section.

In order to investigate this effect experiments with and without high baffles preventing direct flux between area 61 and downcomer 22, and between area 62 and downcomer 21, were conducted. As described above, only a minor effect on tray efficiency was observed without the baffles, but a strong decrease of tray capacity with the baffles. The relevant flow path length parallel to the diametrical line is suitably chosen above a predetermined limit, e.g. 150 mm, 200 mm, 250 mm, or 300 mm.

An example of a tray according to the present invention shall now be discussed quantitatively, wherein reference to parts indicated in FIG. 1 will be made. The tray of the example has a diameter of 1500 mm. The support ring 7 has a width of 50 mm, leaving an effective tray diameter of 1400 mm. The top width of the rectangular downcomer (length of inlet side 55) is 356 mm, and the top width of the corner downcomers (length of sides 48, 49) is 330 mm. The sides 48, 49, 55 run parallel to the line 18 at a distance of 50 mm to allow for the placement of a supporting beam along the line 18 should that be required. The flow-path length, which is calculated as the average distance between a downcomer and the adjacent liquid receiving area on the same tray section is then 281 mm, which is sufficiently long for good efficiency of the tray, while the total downcomer inlet area in this layout is rather large at 27% of the cross-section of the tray. It is impossible to obtain a similar combination of flow path length and total downcomer inlet area for a tray of such small diameter with previously known tray designs, while maintaining a downcomer inlet length that is long enough for sufficiently high tray capacity and efficiency. While maintaining a flow-path length of 250 mm or more, it is possible with the trays according to the present invention to provide a relative downcomer inlet area of or above 15% over the full range from 1 m to 2 m tray diameter, and 20% or more can be provided for column diameters between 1.2 m and 2 m.

The total downcomer inlet length on the tray is 3458 mm, of which 1016 mm runs along the virtual diametrical line 18. It can further be calculated that the rectangular downcomer 23 accounts for 48% of the total downcomer inlet area and for 47% of the total downcomer inlet length, the remainders being evenly distributed over the two half-segmental downcomers 21, 22. Despite the large differences in geometry of the downcomers on both tray sections it is thus possible with the tray of the present invention to provide a downcomer layout that is surprisingly balanced between the tray sections. A balanced design is preferred as it minimizes cross-flow between the tray sections.

It shall be clear that the shape of downcomers can be different from the example shown in FIG. 1. For example, the shape of the sharp corner of a half-segmental downcomer inlet, defined by the longer straight side and the rear side such as sides 46 and 50 of downcomer 21, can be modified in order to fine-tune the ratio of downcomer inlet length and downcomer area. The sharp corner could e.g. be cut off by a further straight side parallel with the side 48, which would also make the manufacturing of the corner downcomers simpler and cheaper. The longer side and the rear side of the corner downcomer inlet opening could also be connected by a plurality of straight sides.

A particular application of the tray of the present invention will now be discussed with reference to FIG. 2. In this application, contacting trays according to the invention are used in combination with separation trays, generally in the way and with the advantages discussed in U.S. Pat. No. 5,885,488.

FIG. 2 shows schematically a vertical cylindrical column 100 in which a number of contacting trays 103a, 103b, 103c according to the invention are arranged in a vertically stacked arrangement. Reference numerals that were already used with reference to FIG. 1, with the addition of a, b, or c, refer to the same or similar parts. The column 100 is shown in longitudinal cross section approximately along the axis of the column, wherein the trays are arranged with their virtual diametrical line defining the semi-circular tray sections in or parallel with the paper plane. Trays 103a and 103c have the same orientation in the column, i.e. the respective downcomers are arranged on top of each other. The intermediate tray 103b is rotated by 180 degrees. In the drawing this is expressed in that of the trays 103a, 103c only the radial downcomers 23a,c are visible, and of tray 103b only the corner downcomers 21b,22b. The downcomers of a contacting tray, e.g. downcomer 23a of tray 103a, are arranged to guide liquid from the contacting tray to an outlet, e.g. 33a, some distance above the bubbling area of the next lower contacting tray, e.g. 103b. The bubbling area is indicated by dashed lines.

In addition to the gas-liquid contacting trays also separation trays 113a,113b are installed. Separation tray 113a is installed below contacting tray 103a and separation tray 113b is installed below contacting tray 103b. Each separation tray is provided with a number of centrifugal separation devices 120, which are suitably distributed over an area corresponding to the bubbling area of the tray above. A typical number is between 10 and 30 separation devices per m² of bubbling area.

Separation trays 113a and 113b are substantially similar except for their orientation in the column. The separation devices 120 are supported by a plate 125a, 125b through which the downcomers of the next higher contacting tray extend. Each separation device 120 comprises a swirl tube 123 which is a tubular conduit having an inlet at its lower end where there is a corresponding opening in the plate 125a. In the interior of the swirl tube there is a swirl-imparting means 128, suitably provided with vanes, for example a vane assembly such as the swirl-imparting means disclosed in International Patent application publication No. WO 2004/073836.

The swirl tube 123 is provided with a return skirt such as annular U-turn deflector 130, that is arranged over the upper end of the swirl tube. The other swirl tubes are similar.

Each separation tray is furthermore provided with means for removing liquid from the separation tray, in the form of downcomer or downcomer pipes 135 and 136, 137, which extend downwardly from an inlet opening in the plate 125a,b. The downcomer 135 of separation tray 113a for example opens into downcomer 21b, which in its turn opens onto contacting tray 103c.

It will be understood that more separation and contacting trays can be installed. In practice the downcomer pertaining to lowermost separation tray of the column will open into the lower part of the column.

During normal operation gas is supplied to the column 100 through a gas inlet in a lower part of the column (not shown), below tray 103c. Liquid is supplied to the column 100 through a liquid inlet (not shown) in an upper part of the column, above tray 103a. In the column 100, gas and liquid are contacted on the horizontal contacting trays 103a,b,c, to exchange matter and/or heat, and after contacting liquid and gas are removed from the column 100 through the gas outlet (not shown) in the upper part of column 100, and through the liquid outlet (not shown) in the lower part of column 100. Excess liquid is removed from the contacting trays 103a,b,c through the downcomers 21a,b,c, 22a,b,c, 23a,b,c (not all of the downcomers are visible in FIG. 2). Some liquid will be entrained with the upward flowing gas.

The performance of a column is determined by the maximum gas flow rate as a function of the liquid flow rate; wherein the maximum gas flow rate is the gas flow rate at which entrainment of liquid by the upwards flowing gas starts. The separation trays 113a,b serve to improve the performance of the column, by reducing entrainment.

In the swirl tubes 120 of the separation trays 113a,b the upwardly flowing gas with entrained liquid is subjected to a centrifugal motion by the swirl-imparting means, and the liquid is flung outwardly and flows predominantly up along or near the inner wall of the swirl tubes. At the upper end of the swirl tube the liquid will break away from the inner surfaces and intercepted by the U-turn deflectors 130 and guided towards the respective floor plate of the separation tray. From there liquid is removed through the downcomers 135,136, 137, which open into the downcomers of the next lower separation tray, so that the liquid is guided onto the bubbling area of the second separation tray below the contacting tray.

Fluid (predominantly gas) flowing up near the vertical axis of the swirl tube is not intercepted by the and can flow upwardly towards the contacting tray above.

A typical vertical distance between consecutive contacting trays is 600 mm, but shorter spacings such as 300 mm are also possible. A typical distance between a contacting tray and the next lower separation tray is 200 mm. A contacting tray can be integrally formed with an adjacent separation tray, such as the separation tray below (in FIG. 2, trays 103a and 113a; 103b and 113b), even before they are mounted in a column.

That which is claimed is:

1. A gas-liquid contacting tray suitable for horizontal mounting in a normally vertical column, which tray comprises a tray plate with substantially circular circumference and having top and bottom surfaces, which tray plate is provided with passages for gas between the bottom and the top surface, and on which tray plate two semi-circular tray sections are defined by a virtual diametrical line of the tray plate; and a total of three downcomers for guiding liquid from the top surface of the tray plate to below the tray, each downcomer extending from an inlet opening arranged in the tray plate to a downcomer outlet opening below the tray, wherein two of the downcomers are arranged in the corners of one of the semi-circular tray sections, and wherein the third downcomer is arranged on the other tray section substantially along a radius of the tray that is perpendicular to the diametrical line.

2. The tray according to claim 1, wherein the ratio of the area of the inlet opening of the radial downcomer to the total area of the inlet openings of both corner downcomers is between 0.75 and 1.25.

3. The tray according to claim 2, wherein the total area of the inlet openings of all three downcomers account for 20% or more of the total cross-sectional area of the tray.

4. The tray according to claim 3 wherein the inlet opening of the radial downcomer defines a radial downcomer inlet length, and wherein the inlet openings of the corner downcomers define a total corner downcomer inlet length, and wherein the ratio of the radial downcomer inlet length to the total corner downcomer inlet length is between 0.75 and 1.25.

5. The tray according to claim 4, wherein the inlet opening of each of the corner downcomers has a side parallel to the virtual diametrical line and a side perpendicular to the diametrical line, and a side substantially conforming to the circumference of the tray.

6. The tray according to claim 5, wherein the side substantially conforming to the circumference of the tray runs at least partly along a straight line.

7. The tray according to claim 6, wherein the side perpendicular to the diametrical line and the side substantially conforming to the circumference of the tray are connected by one or more further sides of the downcomer inlet opening.

8. The tray according to claim 7, in an arrangement with a separation tray adjacent to the contacting tray, which separation tray is provided with one or more centrifugal separation devices.

9. The tray according to claim 8 wherein the contacting tray is integrally formed with the separation tray.

* * * * *